UNITED STATES PATENT OFFICE.

CHARLES BASKERVILLE, OF NEW YORK, N. Y.

PROCESS OF BLEACHING OILS AND FATS.

1,114,095.   Specification of Letters Patent.   Patented Oct. 20, 1914.

No Drawing.   Application filed January 24, 1913.   Serial No. 744,046.

*To all whom it may concern:*

Be it known that I, CHARLES BASKERVILLE, a citizen of the United States, residing at New York, in the county of New York and State of New York, have invented certain new and useful Improvements in Processes of Bleaching Oils and Fats, of which the following is a specification.

For the purpose of bleaching vegetable and animal oils and fats, it is customary to treat the raw material with an inorganic absorbent, such as fullers' earth, either by agitating it with the earth or percolating it through a body of the earth.

I have found that oils and fats, for example, cottonseed oil, either in the crude condition, neutralized with an alkali, or treated with fullers' earth alone, may be converted into products of superior color and brilliance by treating them with a mixture of the fullers' earth or other inorganic absorbent and an organic absorbent, such as wood pulp or unsized paper, which organic absorbent may or may not have received a previous treatment with alkali. I have also discovered that the bleaching action of fullers' earth or other inorganic absorbent, and of the mixture thereof with an organic absorbent, such as wood pulp or unsized paper, is greatly enhanced by the addition thereto of an electrolyte. Electrolytes which, for example, have been used and found desirable, are the chlorid and sulfates of sodium, potassium and iron, calcium chlorid and aluminum-potassium sulfate, sodium chlorid being preferred for bromatological and economic reasons. Halid acids may be used but are regarded as less desirable. The action of the electrolytes used in the process is based on the fact, also discovered by me, that cottonseed oil contains a colloidal coloring-matter, similar in many respects to a dissolved dyestuff. The electrolyte, dissolved in the small amount of water present in the oil and fullers' earth, coagulates, agglomerates or pectizes this colloidal coloring-matter, the aggregated particles being of such comparatively large size that they may be easily removed by the fullers' earth and wood pulp, by absorption and entanglement. The wood pulp has notable dye-absorbing properties, which are enhanced by the mordant action of the electrolyte. I have also discovered that the decolorizing action of the mixtures referred to above is enhanced by agitating the oil with successive portions of the mixture, instead of treating it with the entire amount in a single operation.

In carrying out the present process, based on these discoveries, I preferably treat the cottonseed or other vegetable oil, or liquefied fat, with about twelve per cent. by weight of a mixture of about ten parts of fullers' earth, one part of sodium chlorid and one part of wood pulp containing from twenty to twenty-five per cent. of water. The treatment may be effected at a temperature of 70° C., the decolorizing mixture being added all at once. Cottonseed oil so treated is, after filtering, of a pale yellow color, and is clear and brilliant. By repeating the process, the oil is further bleached.

It has been ascertained that, in practice, approximately three per cent. of fullers' earth will accomplish on an industrial scale what ten per cent. of fullers' earth will accomplish on a laboratory scale. I do not, therefore, restrict myself to ten per cent. of fullers' earth, one per cent. of sodium chlorid and one per cent. of wood pulp.

In the experiments carried out, the wood pulp used contained twenty to twenty-five per cent. of water, but I do not restrict myself to any definite percentage of water in the organic absorbent employed.

I claim:

1. The process of bleaching oils and fats, which consists in treating them with a mixture of an inorganic absorbent having the essential qualities of fullers' earth, and an organic absorbent.

2. The process of bleaching oils and fats, which consists in treating them with a mixture of fullers' earth and a fibrous organic absorbent.

3. The process of bleaching oils and fats, which consists in treating them with a mixture of fullers' earth and a cellulosic material.

4. The process of bleaching oils and fats, which consists in treating them with an inorganic absorbent, an organic absorbent, and an electrolyte.

5. The process of bleaching oils and fats, which consists in treating them with an inorganic absorbent, an organic absorbent, and sodium chlorid.

6. The process of bleaching oils and fats, which consists in treating them with fullers' earth, an organic absorbent, and sodium chlorid.

7. The process of bleaching oils and fats, which consists in treating them with fullers' earth, a fibrous vegetable material, and sodium chlorid.

8. The process of bleaching oils and fats, which consists in treating them with fullers' earth, an organic absorbent, and an electrolyte, the treatment being carried out in successive stages.

9. The process of bleaching oils and fats, which consists in treating them with fullers' earth, a fibrous vegetable material, and an electrolyte, the treatment being carried out in successive stages.

In testimony whereof I affix my signature in presence of two witnesses.

CHARLES BASKERVILLE.

Witnesses:
W. A. HAMOR,
THOMAS F. O'KEEFFE.